Sept. 30, 1924.
E. BUGATTI
1,510,303
RESILIENT SHAFT BEARING RETAINING DEVICE
Filed Oct. 27, 1920
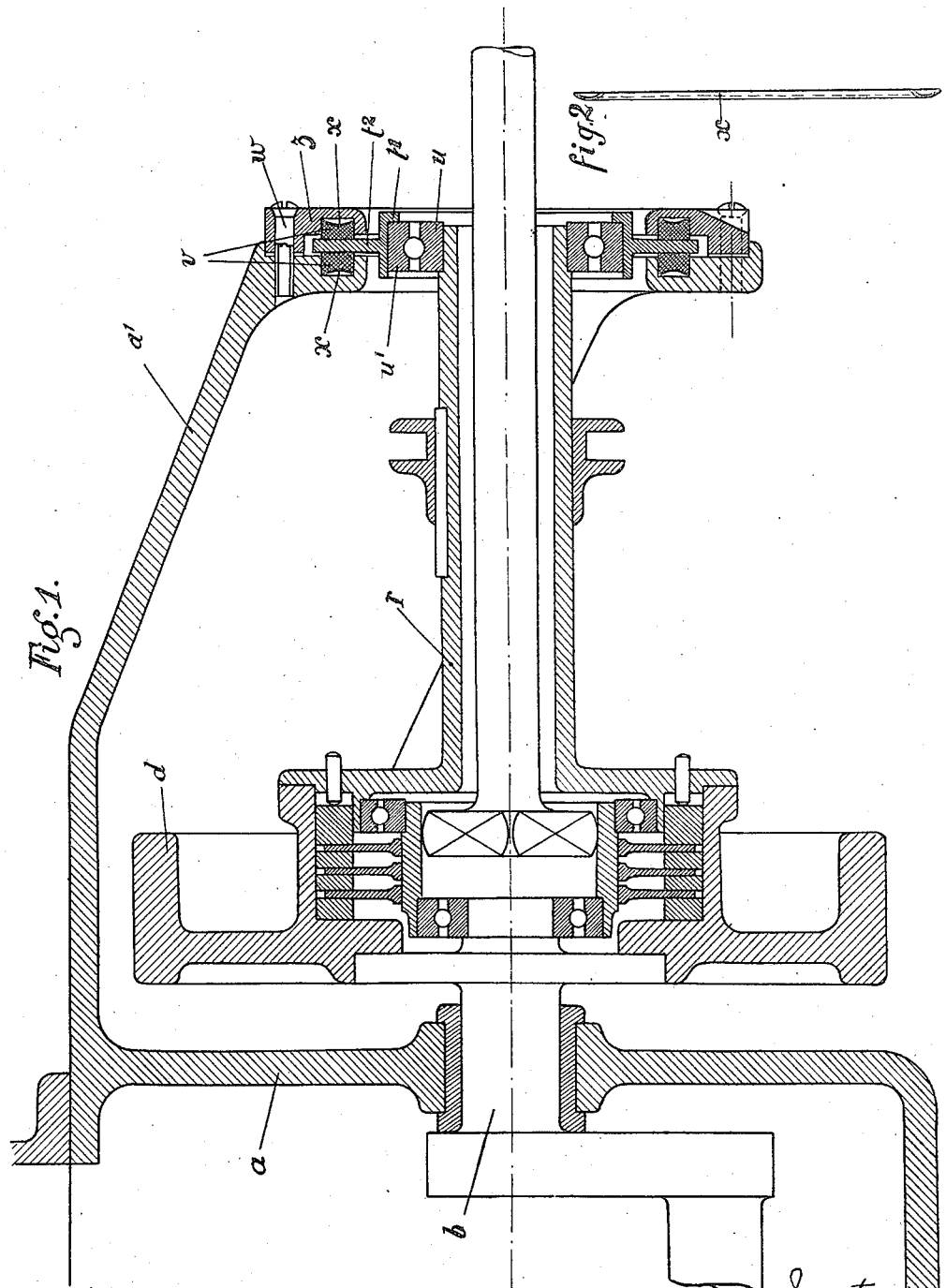
Inventor
Ettore Bugatti
By Henry Orth Jr.
Atty.

Patented Sept. 30, 1924.

1,510,303

UNITED STATES PATENT OFFICE.

ETTORE BUGATTI, OF MOLSHEIM, FRANCE.

RESILIENT-SHAFT-BEARING-RETAINING DEVICE.

Application filed October 27, 1920. Serial No. 419,945.

*To all whom it may concern:*

Be it known that I, ETTORE BUGATTI, a subject of the King of Italy, residing at Molsheim, Alsace, in the Republic of France, have invented certain new and useful Improvements in Resilient-Shaft-Bearing-Retaining Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the United States patent specification No. 1143887, I have described means for obviating the drawbacks to an overhanging fly wheel which is keyed to the end of the engine shaft and forms the casing for the clutch for transmitting the rotation of the said shaft to the Cardan shaft.

Such means consists in prolonging the crank or engine shaft beyond and in rear of the fly wheel by means of a length of a hollow shaft turning in a bearing mounted on a projecting arm or a bracket of the motor casing, the Cardan shaft being arranged within the said hollow shaft.

As stated in the said specification, the said bearing may, for some reason or other, get out of axis with respect to the axis of the engine shaft, which causes the hollow shaft to bend or twist at each turn of the engine shaft so as to attain the position which the out-of-axis bearing obliges it to take. In such circumstances the fly wheel will vibrate and in the end the hollow shaft may fracture.

It is to obviate such a drawback that I have devised the improvement constituting the present invention, which improvement consists in fixing the bearing, not rigidly to the motor casing but resiliently and in a manner that the said bearing can arrange itself in the axis of the motor; the resilient mounting can, for example, be a frictional mounting, the bearing being retained on the arm or bracket by the pressure of rings which may be of leather.

The following description in regard to the accompanying drawing, given by way of example will explain the particular arrangement.

Fig. 1 shows a horizontal section of the improved mounting of the bearing.

Fig. 2 is a detail view in section of a resilient ring.

The hollow shaft $r$, which is fixed, by means of bolts for example, to the fly wheel $d$ which is keyed to the end of the crank shaft $b$ turning in bearing $t'$, with or without interposed ball bearings $u$, the bearing being maintained at the end of the arm $a'$ of the casing $a$ by an elastic or resilient device. To this end, the bearing may comprise a ring $t'$ adapted to accommodate the ball bearings and having externally a flat, circular flange or projection $t^2$, retained by pressure between two discs $v$ of leather or other material, the pressure being produced by means of a plate $z$ which is, for example, attached by means of screws $w$ to the end of the arm or bracket $a'$. It is advantageous to provide in the bottom of the seatings of the discs $v$ the resilient rings $x$ which may be of metal and have a section in the form of an arc of a circle or other curve in order to be capable of flattening by means of their resiliency, which resilient rings transmit to the leather discs the pressure exerted by the plate $z$.

It will be conceived that owing to this pressure mounting, the bearing can adjust itself to the axis of the motor in the case where, for some reason, it is diverted thus attenuating and even suppressing vibration of the fly wheel.

It will be understood that the mode of carrying out the invention is not limited to the arrangement described and that the resilient or yielding connection can be effected in any convenient manner without departing from the spirit of the invention.

Having thus described the nature of the said invention and the best means I know of carrying the same into practical effect, I claim:

1. A shaft bearing comprising a bearing member having a radially directed flange, an annular stationary member, a compression ring for said member, a ring of resilient material on each side of said flange one of said rings arranged in said stationary member and the other arranged in said compression ring.

2. A shaft bearing comprising a bearing member having a radially directed flat flange, a grooved annular stationary member, a grooved compression ring, means for tightening said ring against said member, a ring of resilient material on each side of said flange, one of said resilient members seated in each groove, and a sheet metal ring arcuate in cross section seated in each groove.

In testimony whereof I have signed this specification in the presence of two subscribing witnesses.

ETTORE BUGATTI.

Witnesses:
D. C. WOODS,
PAUL S. SUYAPPELLE.